United States Patent [19]

Sakaguchi et al.

[11] Patent Number: 4,988,032

[45] Date of Patent: Jan. 29, 1991

[54] METHOD FOR ASSEMBLING A STRUCTURAL PANEL IN ORDER TO PREVENT THE SAG THEREOF

[75] Inventors: Akira Sakaguchi; Hisashi Uchibe; Toshiyuki Tange, all of Hyogo, Japan

[73] Assignee: Kawasaki Jukogyo Kabushiki Kaisha, Kobe, Japan

[21] Appl. No.: 498,771

[22] Filed: Mar. 26, 1990

Related U.S. Application Data

[60] Continuation-in-part of Ser. No. 246,933, Sep. 19, 1988, abandoned, Division of Ser. No. 930,185, Nov. 13, 1986, abandoned.

[30] Foreign Application Priority Data

Nov. 29, 1985 [JP] Japan ................... 60-269858

[51] Int. Cl.$^5$ ................ B23K 9/225; B23K 9/235
[52] U.S. Cl. ................... 228/102; 228/232; 228/182; 29/447; 29/448
[58] Field of Search .............. 228/102, 182, 232, 9; 219/346, 351, 352; 29/447, 448

[56] References Cited

U.S. PATENT DOCUMENTS

| | | | |
|---|---|---|---|
| 1,668,523 | 5/1928 | Bentley | 228/232 |
| 2,688,068 | 8/1954 | Marr | 219/354 |
| 2,761,948 | 9/1956 | Todd | 219/354 |
| 3,082,519 | 3/1963 | Ballantine, Jr. et al. | 228/232 |
| 3,125,804 | 3/1964 | Thome | 228/232 |
| 3,683,154 | 8/1972 | Kipple et al. | 219/352 |
| 3,710,550 | 1/1973 | Osborn | 219/354 |
| 4,228,345 | 10/1980 | Stricker et al. | 219/354 |
| 4,449,281 | 5/1984 | Yoshida et al. | 29/447 |
| 4,890,785 | 1/1990 | Sakaguchi et al. | 228/232 |

*Primary Examiner*—Sam Heinrich

[57] ABSTRACT

A method for facilitating the assembly of a structural panel and for preventing the sag thereof comprises the step of placing the structural panel (2), comprising an outer plate (6) and an underlying skeleton framework (7), upon longitudinally extending support beams (B') which interconnect the upper ends of laterally spaced rows of longitudinally spaced support columns (C) which extend upwardly from a floor support surface (F). A mobile radiation heating element truck (4), movable upon laterally spaced rails (8) by means of casters (11), includes radiation heating elements (12). The truck (4) is movable between operative successive operative positions, stages, or stations (A,B), and when the truck (4) is disposed at the first station (A), the plate (6), or a section thereof, is preheated to a predetermined temperature so as to thermally expand the same whereupon the truck (4) is then moved to the second station (B) so as to permit the thermally expanded plate (6) disposed at the first station (A) to be tack-welded and finish-welded to the underlying skeleton framework (7) while a second plate (6), or section thereof, is preheated to a predetermined temperature at the second station (B). Upon cooling of the heated plate (6) disposed at the first station (A), the plate (6) develops a residual tensile stress due to thermal shrinkage deformation whereby sag of the panel is effectively prevented. The support of the panel (2), including the plate (6) and the skeleton framework (7) at the elevated level or height above floor (F) provides substantially unobstructed access to the undersurface regions of the plate (6) and the skeleton framework (7) so as to facilitate the welding operations. Movement of the truck (4) to the next operative position or station (B) likwise provides substantially unobstructed access to the upper surfaces of the plate (6) and skeleton framework (7) so as to likewise facilitate the welding operations to be performed within such regions.

7 Claims, 5 Drawing Sheets

METHOD FOR ASSEMBLING A STRUCTURAL PANEL IN ORDER TO PREVENT THE SAG THEREOF

CROSS-REFERENCE TO RELATED PATENT APPLICATIONS

This patent application is a continuation-in-part of U.S. patent application Ser. No. 246,933 filed on Sept. 19, 1988, abandoned which is, in turn, a divisional patent application of U.S. patent application Ser. No. 930,185 filed Nov. 13, 1986, abandoned.

FIELD OF THE INVENTION

The present invention relates generally to a method for forming or assembling a structural panel, and more particularly to a method for preventing the occurrence of "sag" during the formation or assembly of a structural panel which is to be used in the fabrication or assembly of roof structures, side wall structures of vehicles, ships, buildings, and the like.

BACKGROUND OF THE INVENTION

In recent years, lightening of the aforenoted types of structures has been especially desirable, and a reduction in the thickness dimensions of the structures has accordingly been promoted in an effort to achieve this objective. Soft steel, stainless steel, aluminum alloys, and the like, are usually applied as outer plates for such panels. With the aforenoted promotion of the reduction in the thickness dimensions of the panel structures, however, the occurrence of "sag" within the outer plate member, after completion of the assemblage and welding operations of the outer plates to the underlying structural or support beams, inevitably arises, and problems are therefore posed with respect to the local strength of the "sagging" part of the panel as well as the external appearance of the panel.

With the intention of eliminating the aforenoted distortion effects of the welding process, there has accordingly been disclosed a technique wherein a large number of sheets of standard shape are formed into an elongated outer plate by means of a welding operation, whereupon under the state in which the outer plate is loaded or subjected to a stressed or tensioned state, such plate structures are then attached to a skeleton or structural framework, as disclosed, for example, within the official gazaette of Japanese Patent Application Publication No. 53-39261; or a technique wherein the aforenoted elongated outer plates is loaded in a tensioned state or with tensile stress and is also preheated so as to thermally expand the same, whereupon the outer plate can be attached to the skeleton or structural framework, as shown, for example, within the official gazette of Japanese Patent Application Publication No. 54-20185. Both of these techniques, however, require a large-scale tensioning and heating system which involve enormous installation costs as well as a large number of process steps.

Still further, another drawback of such system is that it is very difficult to precisely control the system so as to achieve a predetermined heating temperature.

Yet still further, there has also been provided a technique wherein an outer plate of a comparatively small size is disposed within a heating box or oven, and the entire outer plate is heated to a predetermined temperature so as to be thereafter welded to a skeleton or structural framework as shown for example within the official gazette of Japanese Patent Application Laid-Open No. 60-64791. In accordance with this technique, however, the heating box or oven is quite complex in structure, and moreover, as the larger plate becomes larger in size, the heating box or over necessarily needs to be proportionally larger in size so as to accommodate the larger plate and panel structure, whereby problems such as, for example, a large floor space and a workshop of large area are incurred, and in addition, the installation costs become significantly high.

OBJECT OF THE INVENTION

In view of the aforenoted problems characteristic of the prior art, the present invention has for its primary objective the provision of a method for preventing the sag of a structural panel wherein the occurrence of "sag" during the assembly of the outer plate members upon the underlying skeleton or structural beam or framework portion of the structural panel is effectively prevented by employing unique processing techniques and operations.

SUMMARY OF THE INVENTION

In accordance with the aforenoted objective of the present invention, the method for accomplishing the assembly of the structural panel by means of the processing techniques and operations uniquely characteristic of the present invention comprises laterally spacing a pair of rows of support columns which project vertically upwardly from a floor support surface such that the columns are also longitudinally spaced with respect to each other within each one of the laterally spaced rows, and mounting longitudinally extending beams upon the upper ends of the columns so as to interconnect the same. A skeleton framework, comprising laterally and longitudinally extending panel structural beams interconnected together, is then mounted upon the longitudinally extending beams disposed atop the support columns, and an outer plate of the composite structural panel is then disposed upon the the skeleton framework. Radiation heating means is subsequently disposed above the upper surface of the outer plate of the composite structural panel so as to preheat the outer plate to a predetermined temperature in order to thermally expand the same prior to and in preparation for the welding of the outer plate to the upper surface of the underlying skeleton framework under such thermally expanded conditions. In this manner, residual tensile stresses are developed within the plate and structural panel as a result of thermal shrinkage deformation of the outer plate during the cooling time period subsequent to completion of the welding operation whereby the occurrence of "sag" within the plate and structural panel is effectively prevented.

The radiation heating means comprises a mobile truck which is movably mounted upon a pair of laterally spaced rails disposed laterally outwardly of the vertically upwardly projecting support columns. The truck includes downwardly facing radiation heating elements supported upon the undersurface of a radiation heating element platform or panel, and the radiation heating element platform or panel is supported by means of downwardly depending legs, disposed at each corner of the platform or panel, the lower ends of the legs being provided with caster wheels or the like for riding upon the laterally spaced rails. In this manner, the mobile truck,.with the radiation heating means disposed thereon, may be movably disposed along the rails such that the radiation heating platform or panel, with the radiation heating element incorporated therein, is disposed above the composite structural panel for accomplishing the aforenoted preheating operation with respect to the outer plate and may be subsequently moved away from the composite structural panel so as to achieve the aforenoted welding operation. When the mobile truck is moved away from the preheated composite structural panel to a location remote from the structural panel, the heating means may be utilized to preheat a successive structural panel, or a successive section of the same structural panel, supported upon the vertical support columns and longitudinally connecting beams, such that fabrication of multiple panels or multiple panel sections may be accomplished in a mass-production mode.

It is to be noted further that the elevation of the structural panel, and in particular, the outer plate thereof, at a substantial height above the supporting floor surface, as a result of the provision of the vertically upstanding support columns, provides substantially unobstructed access for welding personnel and/or equipment to the undersurface portions of the outer plate, and the junctions defined between the outer plate and the upper surfaces of the skeleton framework beams, in order for such outer plate and skeleton beam framework to be secured together by means of, for example, spot welding techniques. Movement of the mobile truck, carrying the radiation heating means, to its remote location following the outer plate preheating thermal treatment likewise provides substantially unobstructed access for such welding personnel and machinery or equipment to the upper surface regions of the outer plate, as well as the junctions defined between the outer plate and the upper surfaces of the skeleton framework, whereby, for example, spot welding techniques can also be employed with respect to the upper surface regions of the composite structural panel.

BRIEF DESCRIPTION OF THE DRAWINGS

Various other objects, features, and attendant advantages of the present invention will become better understood from the following detailed description of the invention, when considered in conjunction with the accompanying drawings, in which like reference characters designate like or corresponding parts throughout the several views, and wherein.

DETAILED DESCRIPTION OF THE PREFERRED EMBODIMENT

Figure 1:
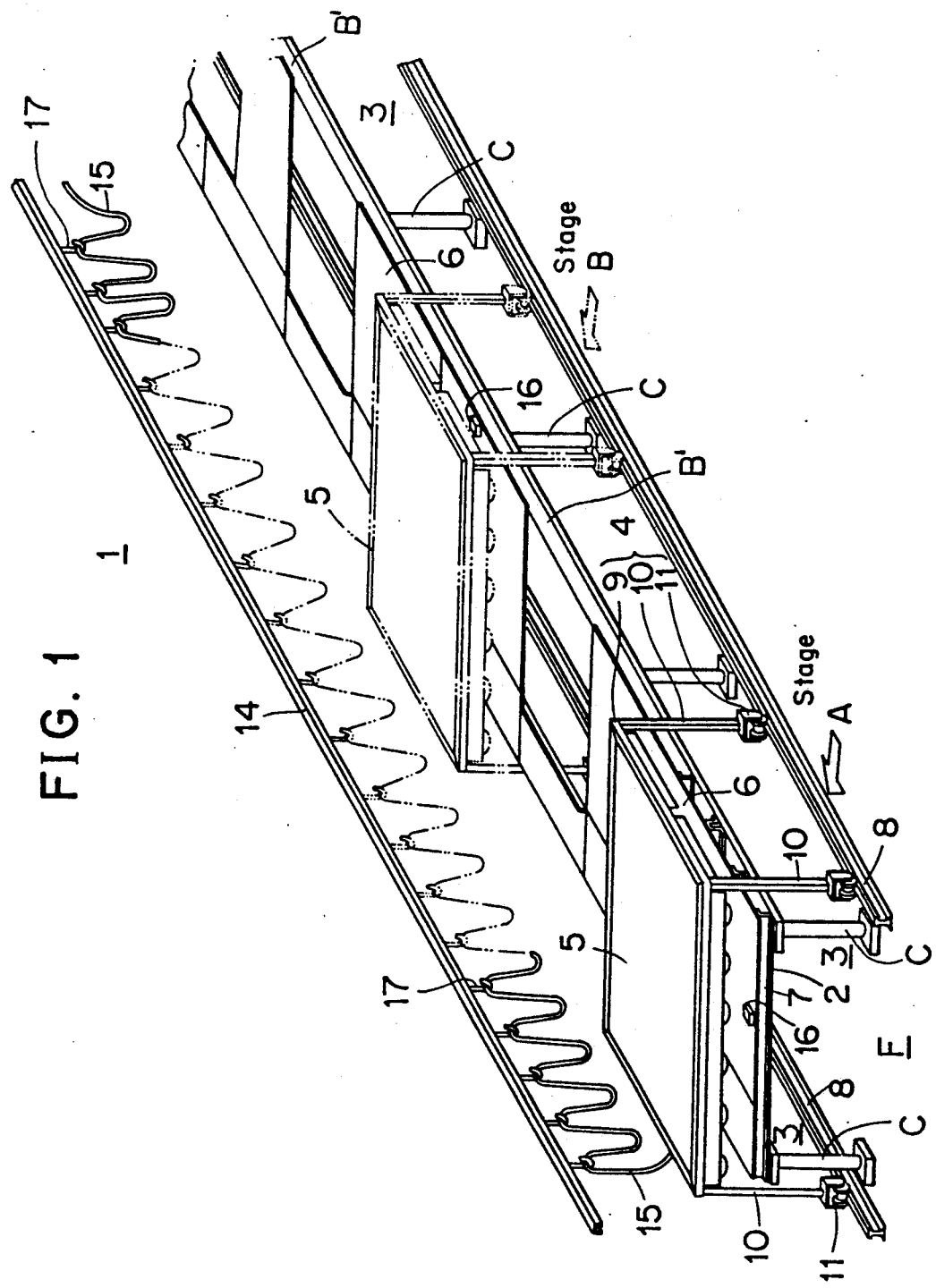
FIG. 1 is a perspective view of the composite structural panel fabricating apparatus utilized for assembling the composite structural panels in accordance with the method and techniques of the present invention.

Referring now to the drawings, the various system components, utilized for carrying out the method and techniques of the present invention, will be described. In particular, the system for carrying out the panel fabricating method and techniques of the present invention is generally designated by the reference character 1 as shown in FIG. 1, and the system is exemplary of that type of system which may be used to fabricate a composite structural panel 2 for railway vehicles. The various components of the fabrication system for achieving the method and techniques in accordance with the present invention is adapted to be supported upon a support surface or floor F, and is seen to generally comprise support means 3, a radiation heating element truck 4, and radiation heating element means 5 supported by means of truck 4.

Figure 1A:
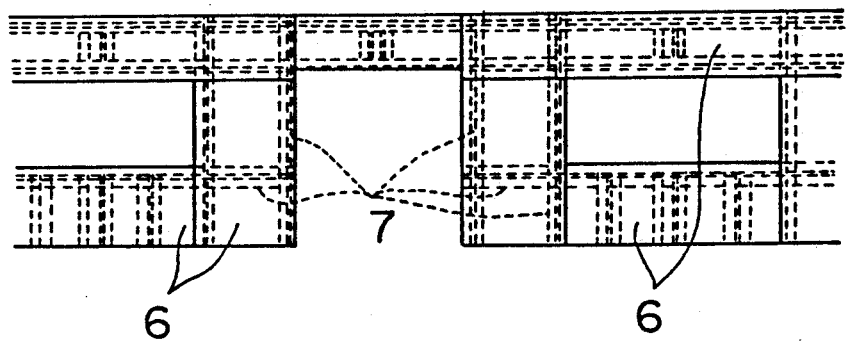
FIG. 1A is a plan view of a structural panel fabricated by means of the method and techniques of the present invention.

More particularly, the support means 3 comprises laterally spaced rows of upstanding support columns C, with the support columns C disposed within each row also being longitudinally spaced from each other. Longitudinally extending beams B' are disposed atop the upper ends of the upstanding support columns C so as to interconnect the same, and a structural panel skeleton framework, comprising longitudinally and laterally extending skeleton beams 7, as more particularly shown in FIG. 1A, has its opposite side edges resting upon the longitudinally extending support beams B' so as to be able to support a rectangular outer plate 6 upon the upper surface thereof whereby the outer plate 6 and skeleton framework 7 comprise the composite structural panel to be fabricated in accordance with the method and processing techniques of the present invention.

A pair of longitudinally extending, laterally spaced rails 8 are fixedly secured to floor surface F at positions disposed laterally outwardly of the upstanding support columns C, and the radiation heating element truck 4 is movably disposed upon the rails 8 between various processing stations A, B, and the like, as will be more apparent hereinafter. The heating element truck 4 is seen to comprise a rectangular framework 9, dependent support legs 10 extending downwardly from the corners of the framework 9, and caster members 11 disposed upon the lower ends of the legs 10 so as to be capable of rolling upon the rails 8. In this manner, the framework 9 of the heating element truck is disposed above the upper surface of the outer plate 6, which is disposed upon the skeleton framework 7, in order to support the heating elements per se at a position above the upper surface of the outer plate 6. In particular, the radiation heating means 5 is supported within the framework 9, and as best seen in FIG. 3, heating means 5 comprises a plurality of heating element support panels or units 13 each of which has supported thereon a plurality of downwardly extending and downwardly radiating heating elements 12 which may comprise, for example, infrared lamps.

Figure 2:
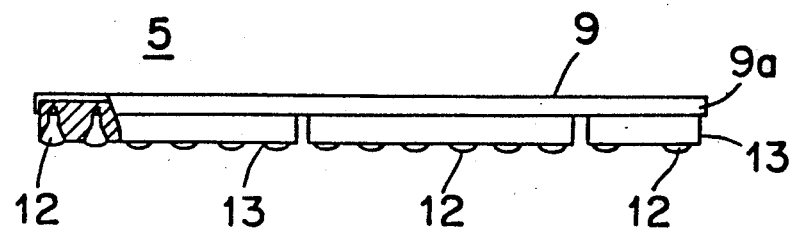
FIG. 2 is a front view, partly in section, of the radiation heating means utilized in accordance with the method and techniques of the present invention.
Figure 3:
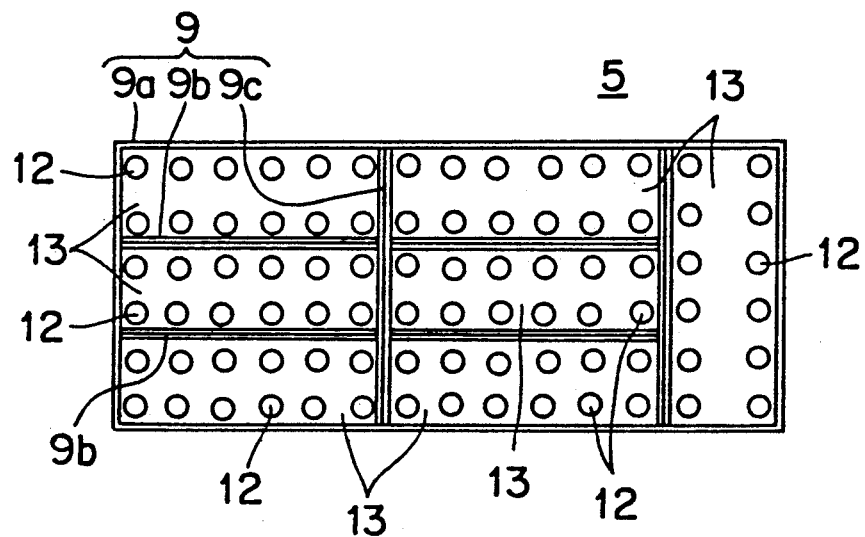
FIG. 3 is a bottom plan view of the radiation heating means shown in FIG. 2.

With respect to the particular structure of the heating element mounting framework 9, it is seen from FIGS. 2 and 3 that the framework 9 comprises a marginal frame member 9a, longitudinally extending frame members or beams 9b, and transversely extending crossbeams 9c, whereby the radiation heating means 5 is divided by means of the framework members 9a-9c into a plurality of regions or units of identical shape. Each heating unit 13 includes twelve heating elements or lamps 12, and a power or feeder cord 15, as seen in FIG. 1, which has a plurality of sections thereof suspended from hook members 17 operatively mounted in a slidable manner from the underside of a guide rail 14 so as to permit free extension or contraction of the power cord 15 in conjunction with the movement of the mobile truck 4 and the heating elements or units 13 carried thereby, is electrically connected to the respective heating units 13 so as to provide electrical power thereto. According to the particular material comprising the outer plate 6 to be heat-treated, as well as the thickness and surface area thereof, the number of heating units 13 to be installed or accommodated upon the mobile truck 4, and to be provided with electrical power, or to have a particular level of electrical power supplied thereto, can of course be varied so as to be accordingly increased or decreased. Similarly, the number of heating elements 12 to be disposed upon each heating unit 13, or the heating capacity or power of each element 12, can likewise be varied by increasing or decreasing the same. Still further, while it has been noted that heating elements 12 may comprise infrared lamps, infrared heating elements of a type other than infrared lamps may of course be employed.

In order to control the heating temperatures or temperature levels to which the outer plates 6 and composite structural panels are to be subjected, temperature sensors 16, as shown in FIG. 1, are disposed at predetermined locations upon the upper surfaces of the outer plates 6. It has been experimentally revealed that for a panel of the size shown in FIG. 5, one or two sensors 16 will suffice for properly controlling the radiation heating means 5.

Continuing further, the fabrication operation for assembling the outer plate 6 to the underlying skeletal framework structure 7, in accordance with the processing method and techniques of the present invention, so as to prevent the occurrence of sag of the panel 2, will now be described. Initially, the skeletal framework 7 is placed upon the upper ends of the upstanding columns 3, and in particular, upon the longitudinally extending support beams B'. The outer plate 6 is then disposed upon the the skeletal framework 7, and as can be readily appreciated from FIGS. 1 and 1A, the outer plate 6 in fact comprises a plurality of outer plate sections 6. In accordance with the method and processing techniques of the present invention, once an outer plate section 6 is placed upon the skeletal framework 7, the radiation heating element truck 4 is then moved to a first operative position or station designated as stage A as seen in FIG. 1 so as to heat the first or forward section of the entire outer plate 6 by means of the radiation heating element means 5 being disposed over or above the first or forward section of the outer plate 6 disposed at stage or station A. The heating elements 12 are then appropriately energized so as to in fact preheat the outer plate 6 disposed at stage or station A to a predetermined temperature T, as will be more fully referred to hereinafter, so as to thermally expand the outer plate section 6. At this time, it is to be additionally appreciated that not only is the outer plate section 6 heated by means of radiant heat from heating elements 12 of the heating means 5, but in addition, the skeleton framework 7 is heated by means of conduction from the preheated outer plate section 6. However, since the surface area portions of the skeleton framework which are in contact with the outer plate section 6 are relatively small, the heat conduction within the skeleton framework 7 is relatively insignificant.

When the plate section 6 disposed at station or stage A reaches its predetermined temperature level, the heating element truck 4 is moved away from its first operative position at stage or station A so as to subsequently or successively dispose its heat radiation means 5 at stage or station B at which a second outer plate section 6 may be preheated to its desired preheated temperature level for achieving thermal expansion thereof. While the heating element truck 4 is therefore disposed at its second operative position at stage or station B so as to preheat the second outer plate section 6 disposed at station or stage B, the first outer plate section 6 disposed at stage or station A is quickly tacked and then finish-welded to the skeleton framework 7. The operations may of course be repeated successively such that succeeding outer plate sections 6 downstream of stage B may be similarly heated, thermally expanded, tacked, and finish-welded. In connection with the welding operations, it has been experimentally verified that if the tack welding is promptly and reliably performed, the plate section 6 within which heat still remains will not develop any considerable tensile stresses, however, the plate 6 will in fact generate sufficient residual tensile stresses after completion of the finish-welding operations. More particularly, upon completion of the fixation of the outer plate section 6 to the skeletal framework 7 by means of, for example, spot welding or finish-welding techniques, the plate 6 in fact develops the proper residual tensile stresses therein due to thermal shrinkage deformation attendant the subsequent natural cooling thereof whereby the completed fabrication of the structural panel 2 comprising the outer plate 6 and skeleton framework 7 is achieved without the occurrence of any "sag". It is further noted at this time that in connection with the performance of the finish-welding operations, spot welding techniques are preferred in connection with the structural panels of this type with which the present invention is operatively associated, however, continuous welding techniques, such as, for example, arc welding, are not desirable in view of the fact that such latter techniques produce undesirable distortions within the panels.

With respect to the control of the degree or level to which the outer plate sections 6 are heated, temperature level control is achieved by means of the aforenoted thermal or temperature sensors 16. Electrical signals generated by means of the temperature sensors 16 are then appropriately utilized to control the energization circuits of the heating elements 12. In particular, and as one example of the temperature level control, one of the sensors 16 may be set at a predetermined low level temperature while another one of the sensors 16 may be set at a predetermined high level temperature so as to in effect control the heating temperature to a value therebetween.

It is to be further noted at this juncture that the fabrication of the structural panel 2 comprising the outer plate sections 6 and the underlying skeleton framework 7 is particularly facilitated by means of the present invention method and techniques in order to in fact achieve a panel free from "sag" and any residual distortion because, as a result of the provision of the support means 3, comprising the vertically upstanding columns C and the longitudinally extending support beams B' disposed atop the upper ends of the support columns C, the structural panel 2 is disposed at a position which is elevated a significant distance above the floor support surface F. In this manner, the spot welding operations can in fact be performed in view of the fact that such elevated disposition of the structural panel provides substantially unobstructed access to the undersurface of the outer plate 6 and the skeleton framework 7 whereby the spot welding operations can in fact be efficiently performed. Similarly, in view of the mobile heating element truck 4, and its movement along the rails from its first operative position at stage or station A to its second operative position at stage or station B, substantially unobstructed access to the upper surfaces of the outer plate 6 and the skeleton framework 7 is facilitated with respect to the outer panel section disposed at station A whereby spot welding operations can likewise be performed from positions above the plane of the structural panel 2. In order to properly achieve the welding operations and the fabrication of the composite structural panel 2, the welding operations are in fact performed from positions both above and below the plane of the structural panel 2, and again, the elevated disposition of the panels 2 by means of the upstanding columns C and the longitudinally extending beams B', plays a critically and integrally important part in facilitating the assembling operations, processing, and techniques of the present invention. It is additionally noted that as a result of the aforenoted elevated disposition of the composite structural panel 2, large-scale transportation or conveying machinery or equipment is enabled to be disposed beneath the panels 2 in preparation for transportation or conveyance of the same, or for placement of the skeleton framework members 7 upon the support means 3. Such machinery or equipment may be, for example, fork-lift or similar type apparatus or equipment conventionally utilized within the construction industry.

Referring again to the preheating portion of the structural panel fabricating process, that is, the preheating operation performed upon the outer plate 6, the preheated temperature T to which the outer plate 6 is to be heated is determined such that the plate 6 may in fact generate the required residual tensile stress, and such temperature T is a function of, or must be considered with respect to, the material comprising the plate 6, the ambient temperature, the strength of the skeleton framework 7, the procedures for handling the outer plate after the pre-heating thereof, the period of time extending from the completion of the tack-welding operation to the commencement of the finish-welding operation, and the like. An example of the predetermined temperature T will now be calculated with respect to a case wherein a stainless steel plate 1.5 mm thick is employed as the plate 6, the ambient temperature is approximately 20° C., and the period of time occurring from the time the plate 6 has been preheated and tack-welded until the finish-welding operation is commenced is approximately 1 minute.

In accordance with such calculations, it is known that the residual tensile stress necessary for preventing the occurrence of any welding distortion of the outer plate 6 upon completion of the welding processes is approximately 15 kg/mm². The temperature difference X, between the outer plate 6 and the skeleton framework 7 upon which the outer plate 6 is disposed and is to be fixedly secured by means of the welding operations, for developing the aforenoted residual tensile stress, is evaluated by means of the following formula:

$$X = k \cdot \delta / \delta y$$ wherein $\delta$: residual tensile stress;
$\delta y$: yield stress or proof stress value;
k: temperature difference at which the tensile stress corresponding to $\delta y$ develops.

Figure 4:
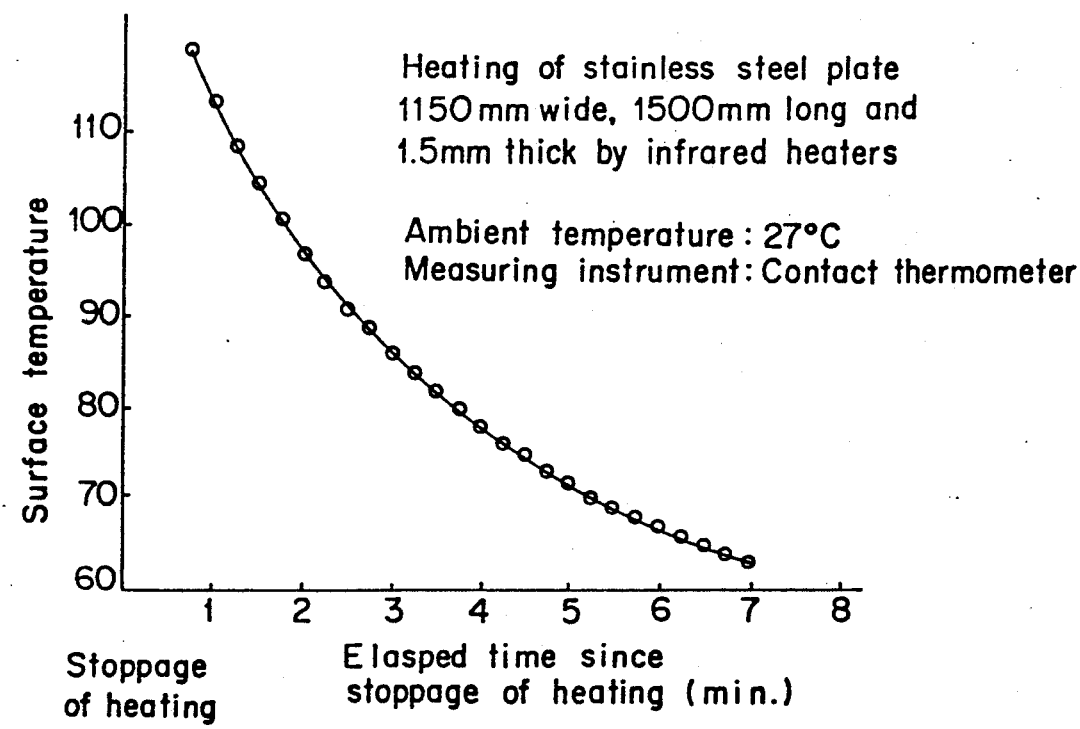
FIG. 4 is a graphical diagram illustrating the cooling characteristics of a plate during the natural cooling stage following the heating thereof.

When $\delta = 15$ kg/mm², $\delta y = 52.7$ KG/mm², and $k = 154°$ C., are respectively substituted into the above-noted formula, the temperature difference X is approximately 44° C. Concomitantly, the cooling rate of the stainless steel plate, when the surface temperature thereof is approximately 90° C., is determined to be approximately 10° C./minute as is readily determined from the graphical diagram of the cooling curve characteristic of such stainless steel plate after the heating thereof, as shown, for example, within FIG. 4. The temperature difference X is to be determined at that point in time at which the welding fixation operation performed upon the outer plate 6 relative to the underlying skeleton framework 7 for securing the plate 6 to the framework 7 has been completed. Therefore, assuming that the period of time occurring between the completion of the heating operation and the completion of the tack welding operation is approximately one minute, and that the ambient temperature, that is, the temperature of the skeleton framework 7, is 20° C., then the target heating temperature for the outer plate 6 is calculated to be 20° C. + 44° C. + 10° C. = 74° C. Accordingly, the predetermined temperature T of the outer plate 6 during the production of the composite structural panel 2 should desirably be set at approximately 80° C. whereby some allowance is made in connection with the aforenoted or calculated target heating temperature.

Figure 5:
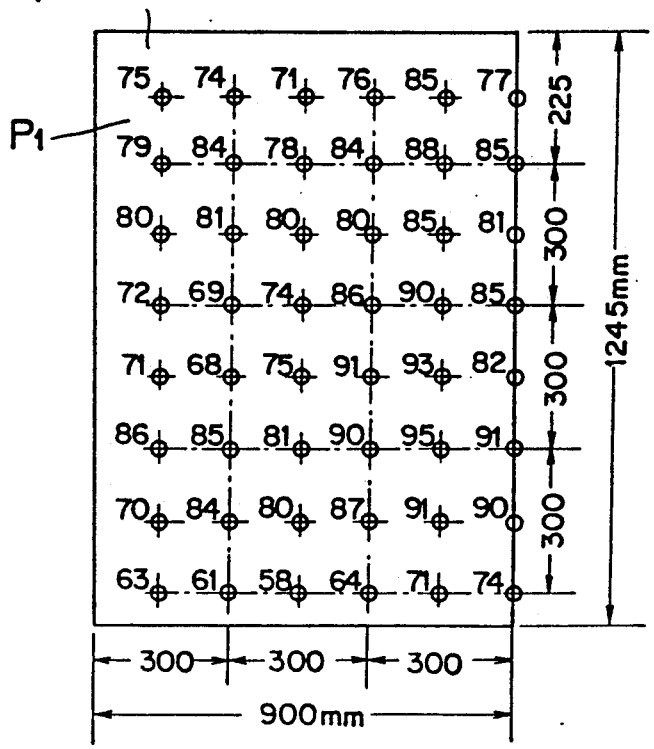
FIGS. 5-7 are diagrams showing the temperature distributions within a test piece plate during a heating test thereof.

In connection with the foregoing, there will now be described the essential points of various heating tests which have been conducted in connection with the uniform heating to 80° C. of stainless steel plates or various shapes or configurations which are to be utilized as the outer plates 6 of the composite structural panels 2. FIG. 5 shows the surface temperatures of a plate which were measured when a test piece or plate $P_1$ comprising a stainless steel plate 1245 mm wide, 900 mm long, and 1.5 mm thick, was subjected to a heating test in which infrared heating lamps, utilized as the heating elements, were energized. This heating test was conducted under the additional test conditions wherein the heating elements comprised thirty-six infrared heating lamps each having a power of 250 W, the distance between the heating elements and the test piece $P_1$ was 175 mm, the heating time period was five minutes, and the ambient temperature was 29° C. The results obtained included a high temperature of 95° C., a low temperature of 58° C., and an average temperature of 80° C. In order to insure a sufficient temperature differential, the plate should preferably be heated for a somewhat longer period of time.

Figure 6:
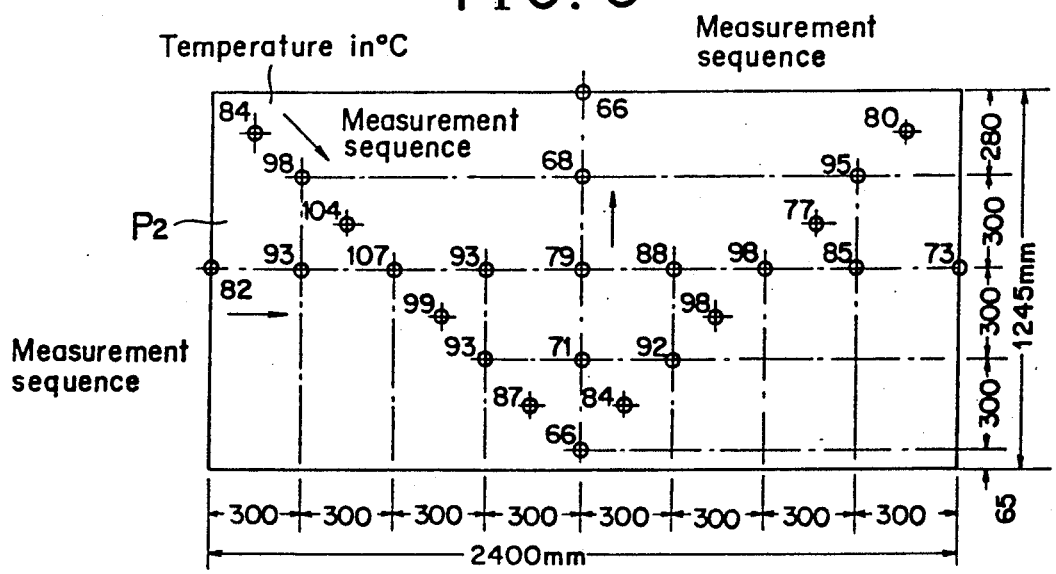

Continuing still further, FIG. 6 discloses surface temperatures which were measured in connection with a test piece $P_2$ which was made from a stainless steel plate 1245 mm wide, 2400 mm long, and 1.5 mm thick and which was subjected to a heating test in which infrared heating lamps were again employed. Seventy-two heating elements or heating lamps, each having a power of 250 W, were employed, the distance between the heating elements and the test piece $P_2$ was 175 mm, the heating time period was five minutes, and the ambient temperature was 22° C. The results obtained included a high temperature of 107° C., a low temperature of 66° C., and an average temperature of 86° C.

Figure 7:
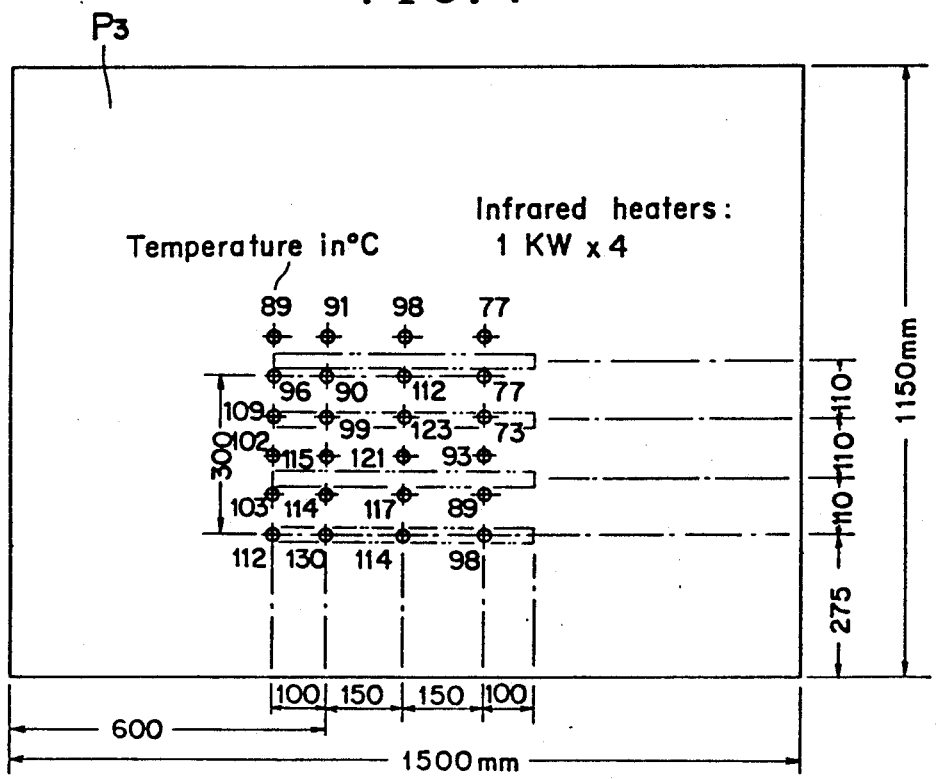

Still yet further, FIG. 7 discloses surface temperatures which were measured in connection with a test piece P3 which was made from a stainless steel plate 1150 mm wide, 1500 mm long, and 1.5 mm thick and which was subjected to a heating test using infrared heaters as the heating elements. This heating test was conducted under the conditions wherein four heating elements were employed, each of which had a power of 1 kW, the distance defined between the heating elements and the test piece P3 was 20 mm, the heating time period was three minutes, and the ambient temperature was 28° C. The results obtained included a high temperature of 130° C., a low temperature of 73° C., and an average temperature of 102° C. Although the average temperature in this case exceeds the predetermined temperature T=80° C. as noted above, the temperature can be controlled so as to achieve the aforenoted appropriate temperature level by shortening the heating time period, adjusting the arrangement of the heating elements, or increasing the distance between the heating elements and the test piece.

It is to be noted that as disclosed within the various embodiments or examples of the present invention as noted above, only a structural panel having a planar configuration has been illustrated as comprising the outer plate 6 and the skeleton framework 7, however, if the skeleton framework could exhibit a sufficient degree of strength and could satisfactorily endure or achieve the appropriate residual tensile stress, then a structural panel having a curved or arcuate configuration and outer surface could likewise be able to be produced in accordance with the fabrication process and techniques of the present invention. Accordingly, the radiation heating means 5 should be formed so as to have a similarly shaped configuration.

The present invention comprises the method and processing techniques as described above, and according to a first aspect of performance of the present invention, the occurrence of "sag" within the outer plate of the composite structural panel can be effectively prevented without restricting the size of the plate per se, and the number of heating elements or heat sources can be adjusted at will in conformity with the material and dimensions of the plate. In addition, the radiation energy and heat can be readily adjusted and very simply controlled through means of the use of appropriate sensors.

According to a second aspect of the present invention, and the performance of the process method and techniques thereof, radiation heating means is provided so as to be movable relative to a predetermined position at which the outer plate and skeleton framework are disposed so as to initially preheat the outer plate, or a section thereof, in order to thermally expand the same, and wherein subsequently, the radiation heating means is moved to a successive operation position, stage, or station at which a second or succeeding outer plate or section thereof, and the associated skeleton framework, are disposed for undergoing a similar preheating operation. At this time, the preceding plate and framework undergo tack welding and finish-welding operations at the first predetermined position, stage, or station, movement of the radiation heating means to the second or successive position, stage, or station facilitating substantially free and unobstructed access to the preceding structural panel and its plate and skeleton framework for performance of the welding operations. Still further, the radiation heating means can be readily adapted to changes in size and thickness of the outer plate, and the material thereof, by adjusting the number, placement, power, and the like, of the particular heating elements employed. Accordingly, this aspect of the present invention brings forth such excellent effects in the fabrication of a structural panel in that the quality of the panel produced is in fact enhanced, and conventional sag-eliminating operations normally performed after completion of the welding operations are able to be dispensed with thereby sharply reducing the number of processing steps of the fabrication operation or process. Still further, the present invention is particularly well-suited to a flow-type production process whereby operations are rendered extremely efficient in a mass-production mode.

Obviously, many modifications and variations of the present invention are possible in light of the above teachings. It is therefore to be understood that within the scope of the appended claims, the present invention can be practiced otherwise than as specifically described herein.

What is claimed as new and desired to be protected by means of Letters Patent of the United States of America, is:

1. A method for preventing sag due to welding within a structural panel of substantially flat construction and comprising a skeleton framework and a thin plate which is to be secured to said skeleton framework, comprising the steps of:

providing a support surface;

laterally spacing a pair of vertically upstanding support means upon said support surface;

placing said skeleton framework upon upper end portions of said laterally spaced pair of vertically upstanding support means such that opposite sides of said skeleton framework are supported upon said upper end portions of said support means at an elevated level above said support surface so as to provide substantially unobstructed access to under-surface portions of said structural panel, formed by said skeleton framework and said plate after said plate has been placed upon said skeleton framework, as well as junction regions defined between under-surface portions of said plate and said skeleton framework after said plate has been placed upon said skeleton framework;

providing mobile radiation heating means which is movable between first and second positions;

moving said radiation heating means to said first position at which said radiation heating means, having downwardly projecting radiation heating elements, is disposed over said plate disposed upon said skeleton framework;

energizing said radiation heating means so as to heat said plate to a predetermined temperature level at which said plate achieves thermal expansion;

moving said radiation heating means to said second position remote from said thin plate when said thin plate has been heated to said predetermined temperature level and has achieved said thermal expansion so as to provide substantially unobstructed access to upper surface portions of said panel formed by said skeleton framework and said plate, as well as junction regions defined between upper surface portions of said plate and said skeleton framework, in order to facilitate securement of said plate to said skeleton framework within the vicinity of said upper and undersurface portions of said structural panel, as well as within said junction regions defined between said undersurface and upper surface portions of said plate and said skeleton framework;

welding said plate to said skeleton framework within said junction regions defined between said upper surface portions and said undersurface portions of said plate, and said skeleton framework, as permitted by said unobstructed access to said junction regions defined between said upper surface portions and said undersurface portions of said plate, and said skeleton framework, as well as said upper and undersurface portions of said panel formed by said plate and said skeleton framework; and permitting said thin plate to cool so as to achieve thermal shrinkage deformation and the development of predetermined residual tensile stresses therewithin whereby the sag of said panel is effectively prevented.

2. A method as set forth in claim 1, further comprising:

controlling said heating of said plate to said predetermined temperature level by said radiation heating means by using at least one temperature sensor.

3. A method as set forth in claim 1, wherein:

said skeleton framework and said plate have a length such that when said radiation heating means is moved to said remote second position, said radiation heating means can be used to heat a second section of said thin plate while said welding operation is being performed upon the originally heated section of said plate at said first position.

4. A method as set forth in claim 2, wherein:

said at least one temperature sensor comprises a single sensor for providing electrical power to said radiation heating means when the temperature of said plate is below said predetermined temperature and will terminate said electrical power to said radiation heating means when said temperature level of said plate reaches said predetermined temperature level.

5. A method as set forth in claim 2, wherein:

said at least one temperature sensor comprises a pair of temperature sensors defining upper and lower temperature levels so as to maintain the temperature of said plate within said predetermined temperature levels.

6. A method as set forth in claim 1, wherein:

infrared lamps are used as said radiation heating means.

7. A method as set forth in claim 1, wherein:

infrared heaters are used as said radiation heating means.

* * * * *